(12) United States Patent
Sluka

(10) Patent No.: US 12,181,677 B2
(45) Date of Patent: Dec. 31, 2024

(54) NEAR-EYE LIGHT-FILED DISPLAY SYSTEM HAVING HIGH EFFICIENCY AND METHOD OF PROJECTING A PROJECTION VIRTUAL PIXEL USING THE NEAR-EYE LIGHT-FILED DISPLAY SYSTEM

(71) Applicant: CREAL SA, Ecublens (CH)

(72) Inventor: Tomas Sluka, Lausanne (CH)

(73) Assignee: CREAL SA, Ecublens VD (CH)

( * ) Notice: Subject to any disclaimer, the term of this patent is extended or adjusted under 35 U.S.C. 154(b) by 0 days.

(21) Appl. No.: 18/277,756

(22) PCT Filed: Feb. 18, 2021

(86) PCT No.: PCT/IB2021/051373
§ 371 (c)(1),
(2) Date: Aug. 17, 2023

(87) PCT Pub. No.: WO2022/175716
PCT Pub. Date: Aug. 25, 2022

(65) Prior Publication Data
US 2024/0126083 A1    Apr. 18, 2024

(51) Int. Cl.
G02B 27/01    (2006.01)
G02B 27/09    (2006.01)

(52) U.S. Cl.
CPC ..... *G02B 27/0172* (2013.01); *G02B 27/0961* (2013.01); *G02B 2027/0112* (2013.01); *G02B 2027/0178* (2013.01)

(58) Field of Classification Search
None
See application file for complete search history.

(56) References Cited

U.S. PATENT DOCUMENTS

| 10,629,105 | B2* | 4/2020 | Perreault | A61B 3/1015 |
| 2017/0102545 | A1* | 4/2017 | Hua | G06T 19/006 |
| 2019/0339528 | A1* | 11/2019 | Freeman | G09G 3/002 |

FOREIGN PATENT DOCUMENTS

| CN | 103513433 A | 1/2014 |
| CN | 208351150 U | 1/2019 |

(Continued)

OTHER PUBLICATIONS

International Search Report and Written Opinion for PCT/IB2021/051373 dated Oct. 29, 2021, 11 pages.

(Continued)

*Primary Examiner* — Christopher J Kohlman
(74) *Attorney, Agent, or Firm* — BLANK ROME LLP

(57) ABSTRACT

The present disclosure concerns a near-eye light-field display system comprising an emissive display (1), containing a plurality of display pixels (10, 12), each display pixel (10, 12) having color information and being individually addressable to be set inactive or active where it generate a light beam (111); and a lens array (14) comprising an array including a plurality of lenses (140) and configured to project the light beams (111) of the active display pixels (10, 12) to form a projection virtual pixel image (26). The projection pixel image (26) having color information and a position in space that are determined by the number of the active display pixels (10, 12) and their position on the emissive display (1). The present disclosure further concerns a method of projecting a projection virtual pixel using the near-eye light-field display system.

16 Claims, 5 Drawing Sheets

(56) References Cited

FOREIGN PATENT DOCUMENTS

| CN | 210864221 U   | 6/2020 |
|----|---------------|--------|
| JP | 2013/142743 A | 7/2013 |
| JP | 5948059 B2    | 7/2016 |
| TW | 201612591 A   | 4/2016 |
| TW | 2019/03466 A  | 1/2019 |
| TW | 201905537 A   | 2/2019 |

OTHER PUBLICATIONS

Emagin Corporation "eMagin Corporation WUXGA-R5 1920 X 1200 Low-Power Color XL Amoled Microdisplay Datasheet Revision", http://www.emagin.com/images/products/wuxga/datasheets/1000092_Rev_A_WUXGA_R5_C; Feb. 1, 2017; pp. 1-86.

\* cited by examiner

NEAR-EYE LIGHT-FILED DISPLAY SYSTEM HAVING HIGH EFFICIENCY AND METHOD OF PROJECTING A PROJECTION VIRTUAL PIXEL USING THE NEAR-EYE LIGHT-FILED DISPLAY SYSTEM

RELATED APPLICATION

This application is a national phase application of International Application No. PCT/IB2021/051373, filed on Feb. 18, 2021. The entire contents of this application is incorporated herein by reference.

TECHNICAL DOMAIN

The present invention relates to displays, more particularly to displays providing 3D images with correct monocular depth cues. More particularly, it relates to a near-eye light-field display for virtual and augmented reality goggles and glasses, and virtual and augmented reality applications.

RELATED ART

Today's light-field displays use, among other concepts, conventional emissive 2D displays in combination with attached lens arrays or other optical elements doing the same. With such light-field displays, each projected virtual pixel is represented by a number of real display pixels (on the display) which typically leads to reduction of the effective resolution of the whole system and causes redundancy in color information per virtual pixel. The redundancy can be up to 30 to 60 times. Another drawback is that collimation of the light emitted by the real pixels and performed by each lens is imperfect, partly due to the inevitably imperfect optical properties of the lenses, but also due to diffraction on their small aperture.

SUMMARY

The present disclosure concerns a near-eye light-field display system using a two-dimensional emissive display with a lens array that overcomes the shortcomings and limitations of the state of the art.

The present disclosure concerns a near-eye light-field display system comprising an emissive display comprising a plurality of display pixels, each display pixel having color information and being individually addressable to be set inactive or active such as to generate a light beam towards a pupil plane. The light-field display system further comprises a lens array positioned between the emissive display and the pupil plane, the lens array comprising an array including a plurality of lenses and being configured to project the light beam generated by the active display pixels to form a projection virtual pixel image. The color information of the projection pixel image and the position in space of the projection pixel image are determined by the number of the active display pixels and their position on the emissive display. The color information of the projection pixel image is the sum of the color information of the active display pixels.

The present disclosure further concerns a method of projecting a projection virtual pixel using the near-eye light-field display system.

The present disclosure further pertains to a non-transitory machine-readable medium storing machine executable instructions that when executed causes a computing system to carry out the method of projecting a projection virtual pixel using the near-eye light-field display system.

The near-eye light-field display system disclosed herein, using high-density emissive display with low color resolution of each pixel, requires minimal data and computing effort to deliver at least the same perceived quality than when using a known system.

SHORT DESCRIPTION OF THE DRAWINGS

Exemplar embodiments of the invention are disclosed in the description and illustrated by the drawings in which.

EXAMPLES OF EMBODIMENTS

Figure 1:
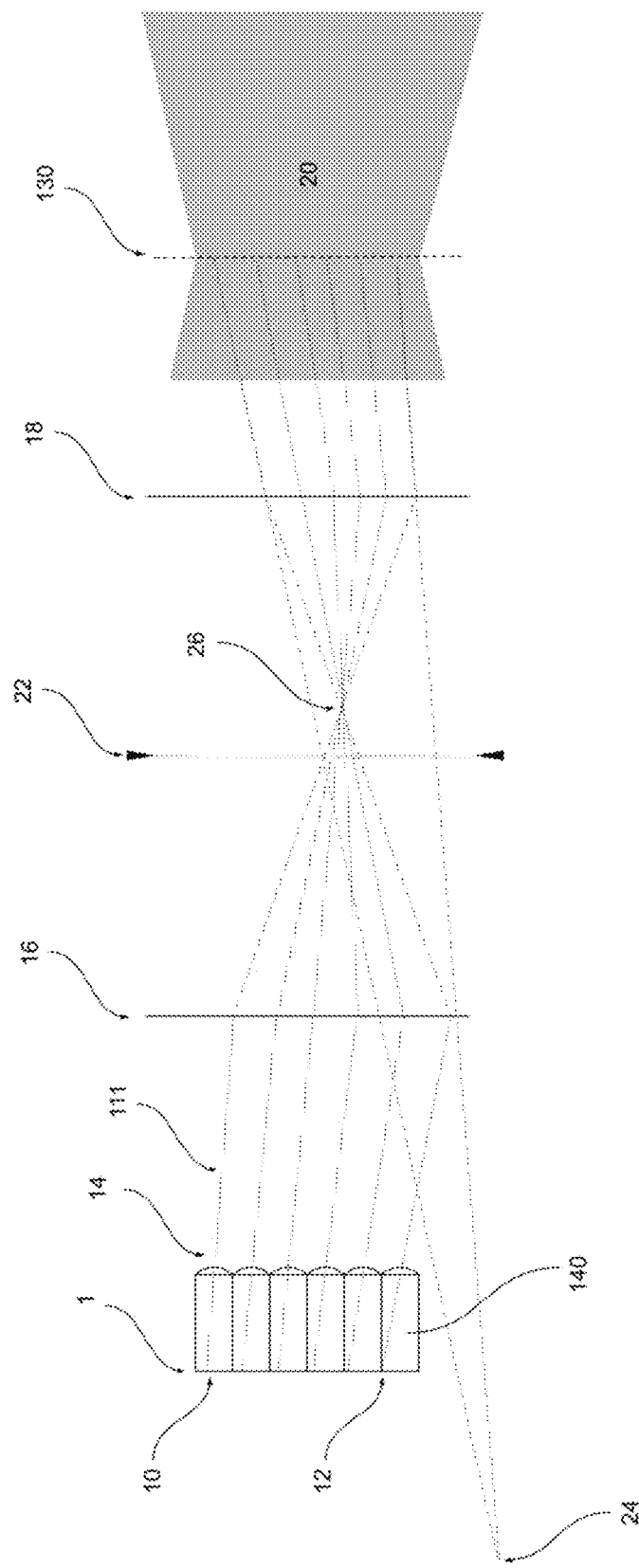
FIG. 1 shows a near-eye light-field display system comprising an emissive display, according to an embodiment.

FIG. 1 shows a near-eye light-field display system according to an embodiment. The light-field display system comprises an emissive display 1 comprising a plurality of display pixels 10, 12, each display pixel 10, 12 having color information and being addressable such as to be in an "off" state (inactive) where it does not generate light, or an "on" state (active) such as to generate a light beam 111 towards the pupil plane 130. In other words, the emissive display 1 is a binary display since its gradation in the digital gradation display light emission period is binary display of "light emission" and "non light emission". The light-field display system further comprises a lens array 14 positioned between the emissive display 1 and the pupil plane 130. The lens array 14 comprises an array including a plurality of lenses 140, each lens 140 encompassing a subset of the plurality of display pixels 10, 12. The emissive display 1 is two-dimensional.

The lenses 140 in the lens array 14 can comprise diffractive grating optical elements, refractive optical element, Fresnel optical element, holographic optical element or a combination of these optical elements.

Figure 2:
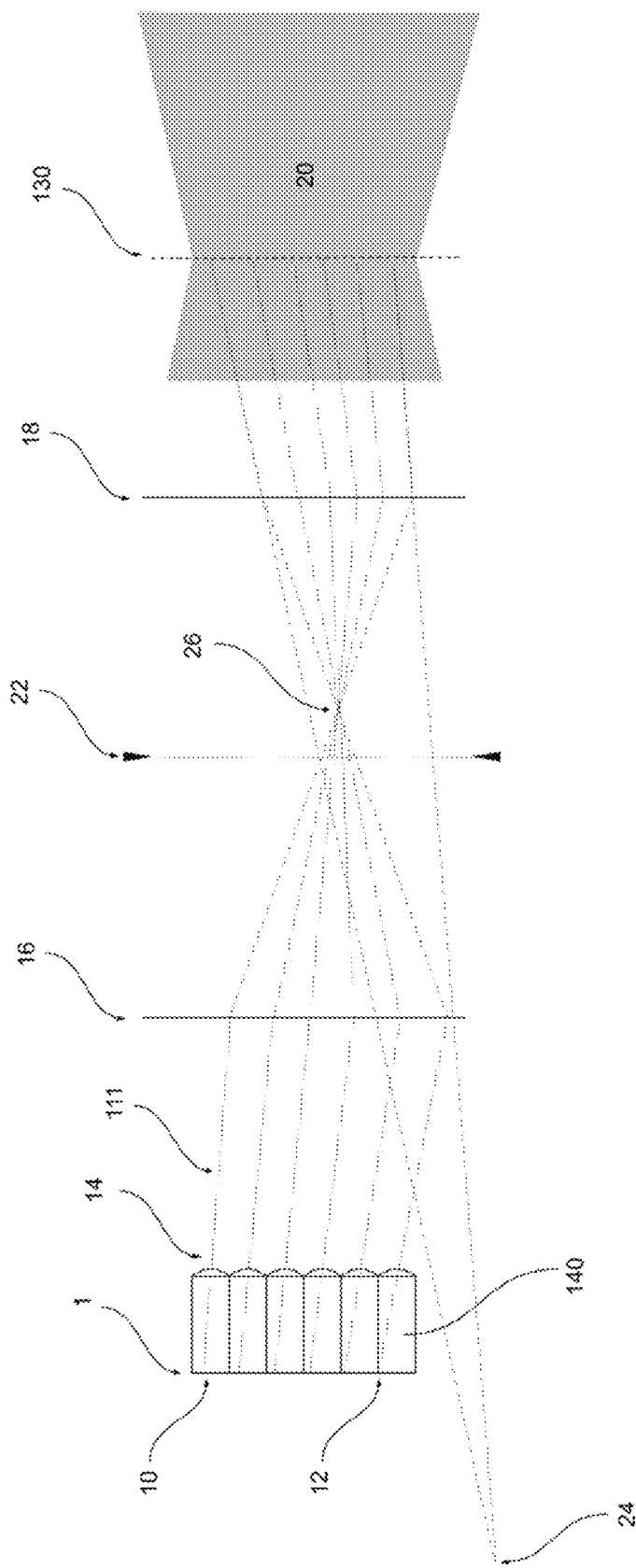
FIG. 2 represents the near-eye light-field display system of FIG. 1, showing projection of light beams and a projected virtual pixel of a virtual image, according to an embodiment.

As shown in FIG. 2, the lens array 14 is configured to project the light beams 111 generated by the display pixels 10, 12 being active such as to form a projection virtual pixel 26 of a virtual image. The color information of the projection virtual pixel 26 and the position of the projection virtual pixel 26 relative to the pupil plane 130 is determined by the number of the display pixels 10, 12 being active and their position on the emissive display 1. For example the active display pixel coordinates on a flat emissive display 1.

The light-field display system can comprise an imaging optical element 16 configured to project the light beams 111 such as to form a projector image plane 22 positioned between the lens array 14 and the pupil plane 130. The imaging optical element 16 deflects the light beams 111 such that they intersect and form the projection virtual pixel 26 in the projector image plane 22.

The light-field display system can further comprise projection optics 18 configured to project the light beams 111 such as to define an eye-box 20 at the pupil plane 130. The eye-box 20 defines characteristics of a viewer's eye, such as expected diameters, orientations (i.e., rotations), and positions of the pupil. The projection optics 18 can comprise an eyepiece or a combiner.

FIG. 2 further illustrates the construction of a single projection virtual pixel 26 before the projection optics 18 and an eye-box virtual pixel 24 of a virtual image, as seen from the eye-box 20. The projection and eye-box virtual pixels 24, 26 are constructed from the cross sections of the light beams 111 generated by the display pixel 10, 12 being active. In particular, each of the projection and eye-box virtual pixels 24, 26 are constructed from the sum of light beam 111 projected by each lens 140 where the corresponding display pixel 10, 12 is active.

In an embodiment, the lens array 14 comprises a matrix array containing between 25 lenses 140 and 64 lenses 140. In such configuration, the projection and eye-box virtual pixels 24, 26 can be constructed from light beams 111 generated by active display pixels 10, 12, each play pixel 10, 12 illuminating one lens 140, to form the cross sections of the light beams 111 generated by 25 display pixels 10, 12.

The color of the projection and eye-box virtual pixels 24, 26 is determined by the fraction of the active display pixels 10, 12 versus the inactive display pixels 10, 12. The color information of the projection and eye-box virtual pixels 24, 26 is the sum of the color information of the active display pixels 10, 12 on the emissive display 1.

Figure 3:
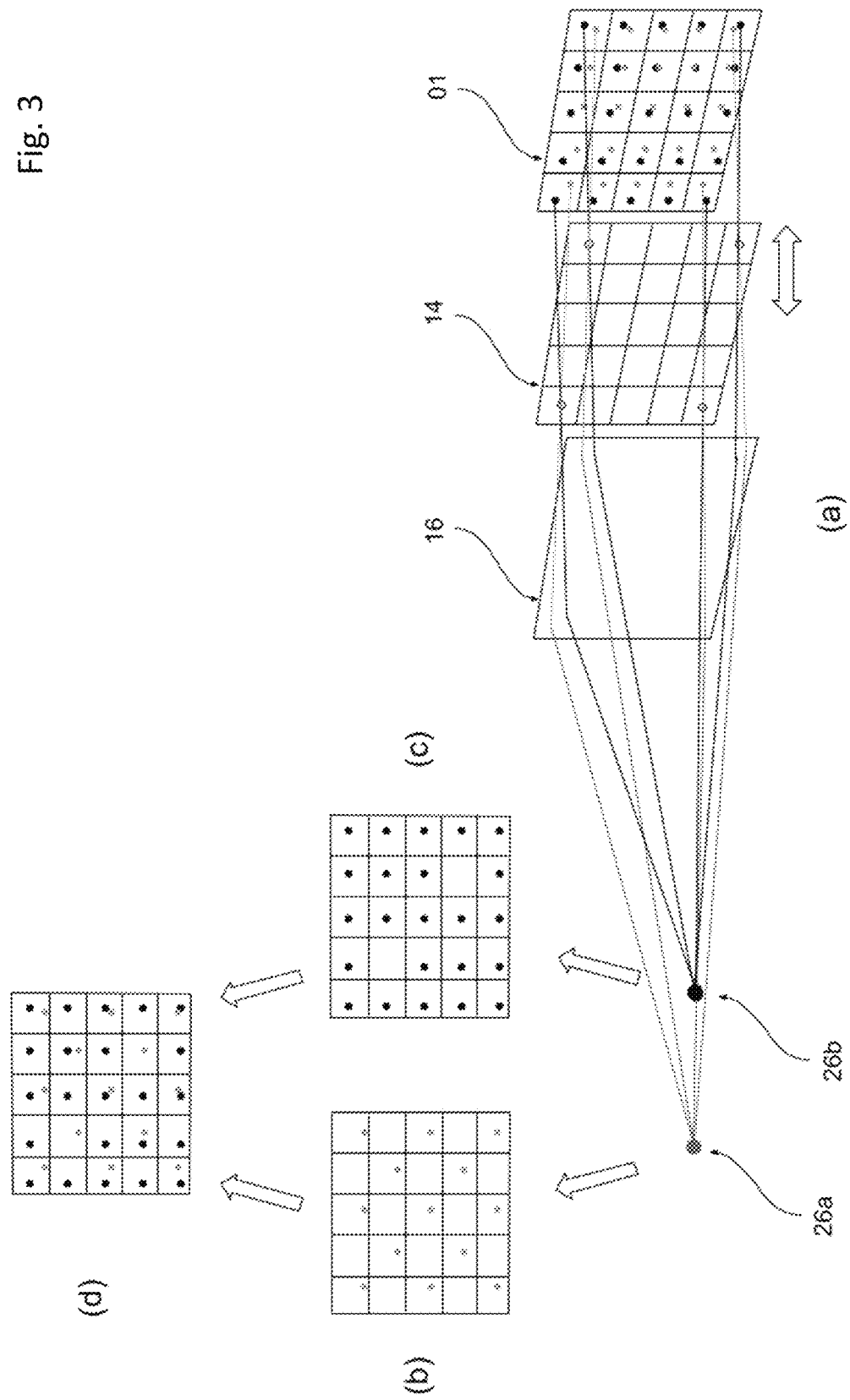
FIG. 3 illustrates the projection of two virtual pixels from active display pixels of the emissive display (FIG. 3a), a distribution of the active display pixels for constructing a first virtual pixel (FIG. 3b) and a second virtual pixel (FIG. 3c) and a combination of the distribution for constructing the two virtual pixels (FIG. 3d), according to an embodiment.

FIG. 3a illustrates the projection of a first projection virtual pixel 26a from light beams 111 generated by a first set of active display pixels 10, 12 (grey dots), each active display pixel 10, 12 of the first set being projected by a distinct lens 140 of the lens array 14. FIG. 3a further illustrates the projection of a second projection virtual pixel 26b from light beams 111 generated by a second set of active display pixels 10, 12 (black dots), each active display pixel 10, 12 of the second set being projected by a distinct lens 140 of the lens array 14. In the example of FIG. 3a, a lens array 14 comprising of 5×5 lenses 140 is used for illustration. The first and second projection virtual pixels 26a, 26b are constructed before the projection optics 18 (not shown in FIG. 3).

Each of the first and second projection virtual pixels 26a, 26b can correspond to a predefined fraction of the active display pixels 10, 12 versus the inactive display pixels 10, 12. Each first and second projection virtual pixels 26a, 26b can correspond to a random distribution of the active display pixels 10, 12 on the emissive display 1. FIG. 3b shows an exemplary fraction and distribution of the active display pixels 10, 12 on the emissive display 1 for constructing the first projection virtual pixel 26a. FIG. 3c shows an exemplary fraction and distribution of the active display pixels 10, 12 on the emissive display 1 for constructing the second projection virtual pixel 26b. FIG. 3d shows the combination of the fraction and distribution of the active display pixels 10, 12 on the emissive display 1 for constructing the first and second projection virtual pixels 26a, 26b. The combination of the first and second projection virtual pixels 26a, 26b can correspond to a full color virtual pixel from a plurality of low color resolution display pixels 10, 12 on the binary emissive display 1.

In various embodiments, the display pixel 10, 12 can comprise a 1-bit color resolution (2 colors, often black and white). Here, the projection virtual pixel 26a, 26b can have 26 grayscale levels for each base color from the display pixel 10, 12 on the binary emissive display 1. Alternatively, the display pixel 10, 12 can comprise a 2-bit color resolution such that the projection virtual pixel 26a, 26b can have 104 grayscale levels. Since the display pixel 10, 12 comprise a more than 1-bit color resolution, the emissive display 1 is no more a binary display. The display pixel 10, 12 can comprise a 3-bit color resolution such that the projection virtual pixel 26a, 26b can have 208 grayscale levels. The display pixel 10, 12 can further comprise a more than 3-bit color resolution. The projection virtual pixel 26a, 26b having 256 grayscale levels can be obtained for example, if the lens array 14 comprises an array of 16×16 lenses 140 and the display pixel 10, 12 comprises a 1-bit color resolution, or if the lens array 14 comprises an array of 8×8 lenses 140 and the display pixel 10, 12 comprises a 2-bit color resolution.

In some aspects, grayscale levels can be increased by the pixel density. When using sub-optimal optics 14, 16, 18, pixel resolution can be higher than the optical resolution of the optics 14, 16, 18. For example, a 2×2 display pixels on the binary emissive display 1 can be perceived as one pixel with five color levels.

The color resolution increases linearly with the number of lenses 140 in the lens array 14. On the other hand, the color resolution has lower requirements in a wide range of augmented reality applications.

In various embodiments, the lens array 14 can comprises an array of 2×2, 4×4, 5×5, 6×6, 7×7, 8×8, 9×9, 10×10, 11×11, 12×12, 13×13, 14×14, 15×15, 16×16 lenses 140. Other arrangements of the lens array 14 are however possible, for example the lens array 14a can comprise a rectangular matrix or any other matrix geometries.

Since the lens array 14 is placed outside the accommodation range of a viewer (the image of the lens array is located in the eye-box 20 where it typically coincides with the viewer's eye pupil), and technically in a Fourier's space, the lens array 14 can have low density and large lenses 140.

In some aspects, the lens 140 has a width (or the lens pitch is) between 1 to 5 mm.

In practical terms, the lens array 14 can comprise an array of 2×2 lenses 140, each lens having a diameter of 1 to 5 mm. In such configuration, each display pixel 10, 12 should have high color information (more than 1-bit color resolution). Moreover, additional aperture filters may be required in order to approximate a pinhole projection of each viewpoint (image of the lens 140).

On the other hand, the lens array 14 comprising more than 16×16 lenses 140 may require a larger emissive display panel even with small lenses 140 (e.g., 0.3 mm to 1 mm in diameter) in order to keep the size of each pixel beam (light beam 111) above acceptable aperture- or self-diffraction limits.

The lens array 14 comprising between 5×5 and 8×8 lenses 140 can be considered as optimum (advantageous) for most applications.

The emissive display 1 can have a high-density of display pixels 10, 12. For example, the emissive display 1 can comprise a plurality of micro-LED, micro-OLED or other light-emitting devices capable of micrometer scale or submicron pixel-pitch. As mentioned above, the display pixels 10, 12 can be low-color resolution (such as 1-bit color resolution).

Any one or both of the imaging optical element 16 and the projection optics 18 are optional for the functioning of the light-field display system. In other words, the lens array 14 alone can be the exit pupil of the light-field projection system. On the other hand, the imaging optical element 16 and/or the projection optics 18 allow to create a physical distance between the light-field source (the emissive display 1) and the eye-box 20. For instance, the imaging optical element 16 and/or the projection optics 18 enable larger eye-relief.

In FIG. 2, the axisymmetric arrangement of the imaging optical element 16 and the projection optics 18 is only illustrative. The imaging optical element 16 and the projection optics 18 can be asymmetric and can include light-guides and diffractive optics elements as long as the optics does not replicate the entrance pupil or individual pixel beams (light beams 111) in the light-field part of the image formed by the projection and eye-box virtual pixels 26, 24.

In one aspect, the light-field display system can comprise a pupil replication device (not shown), such as an imaging waveguide comprising an imaging out-coupling element, for pupil expansion of, for instance, peripheral parts of the image. The pupil replication device can create a peripheral eye-box region enlarging the eye-box 20 size.

Figure 4:
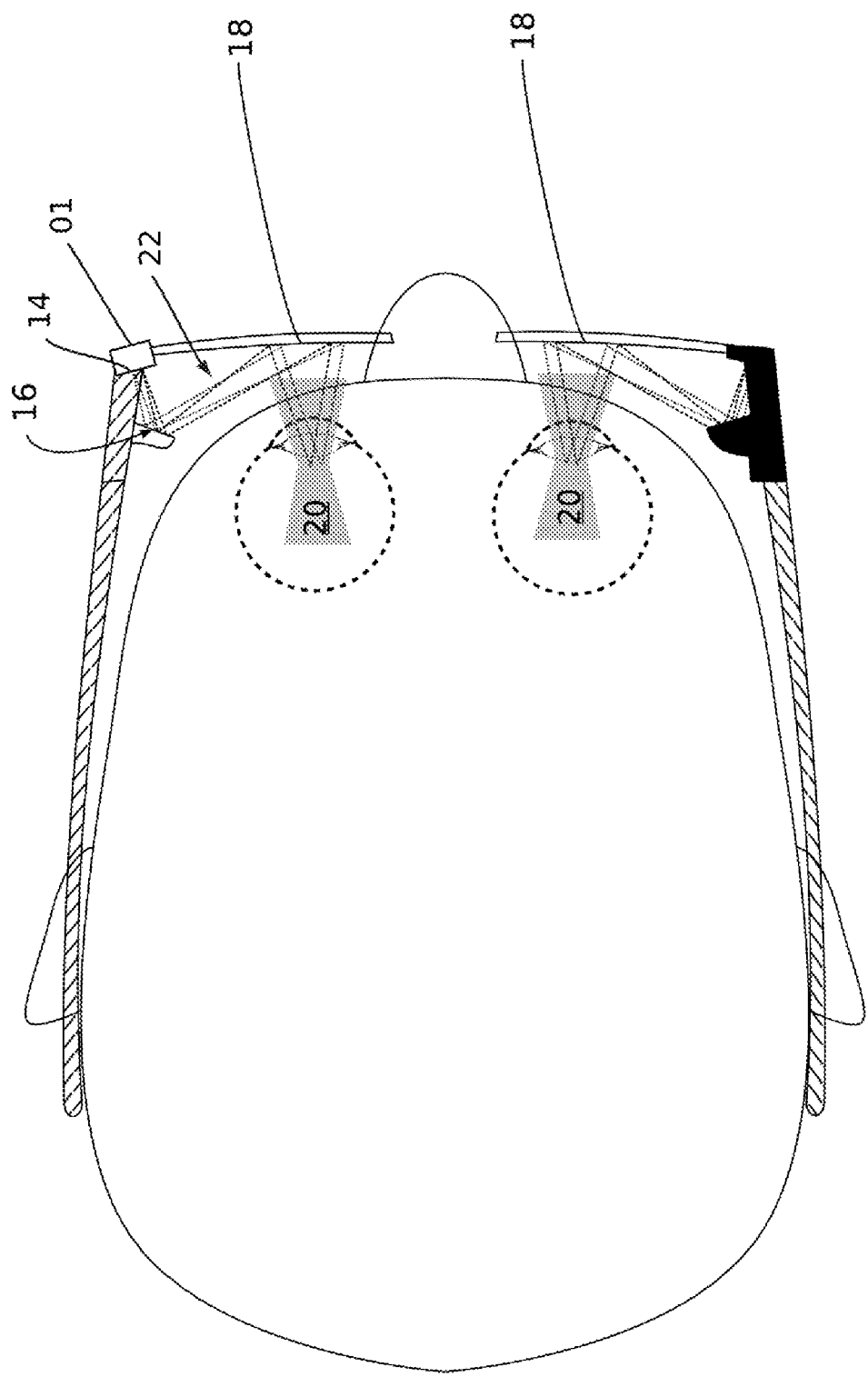
FIG. 4 shows a wearable device comprising the near-eye light-field display system, according to an embodiment.

In an embodiment, a wearable device comprises the near-eye light-field display system disclosed herein. The wearable device can be adapted for virtual reality or augmented reality applications. The wearable device can comprise virtual reality or augmented reality glasses. As illustrated in FIG. 4, the wearable device can be embodied in an eyeglass form factor that includes two emissive displays 1 and two lens arrays 14 to form a binocular near-eye light field display device, where a first emissive display and lens array set is associated with a user's left eye and a second emissive display and lens array set is associated with a user's right eye. In the configuration of FIG. 4, the projection optics 18 comprises a combiner integrated in the lenses of the glasses (the combiner is transparent for the light from the real world, i.e. it lets the outside light pass to an observer's eye pupil, while it projects the light beams 111 towards the eye-box 20). The emissive display 1 and the imaging optical element 16 can be included in the hinges or another portion of the temples of the glasses.

Figure 5:
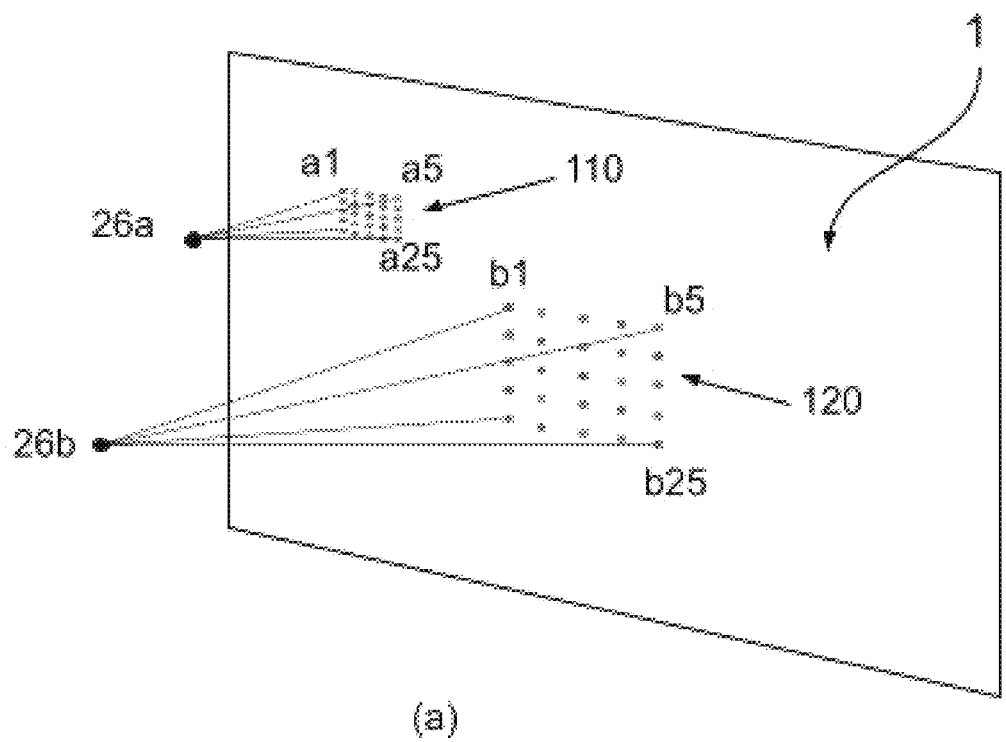
FIG. 5 illustrates a method of projecting a projection virtual pixel using the near-eye light-field display system showing a construction of a subset of display pixels for a first and second virtual pixel (FIG. 5a) and a distribution to an individual physical sub-panel (FIG. 5b).

FIGS. 5*a* and 5*b* illustrate a method of using the near-eye light-field display system, according to an embodiment. The method comprises:
- providing a vector data corresponding to the color information of the projection virtual pixel 26 and the position of the projection pixel 26 relative to the pupil plane 130;
- addressing the emissive display 1 with the vector data, such as to select a subset of display pixels 110, 120 of the emissive display 1; and
- setting in the on state (activating) the selected subset of display pixels 110, 120 such that each display pixel 10, 12 in the selected subset of display pixels 110, 120 generate a light beam 111.

In one aspect, the vector data can comprise a color model and a coordinate set. For instance, the color model can comprise a three-byte hexadecimal number representing red, green, and blue components of the color. The coordinate set can comprise Cartesian x, y, z coordinates.

FIG. 5*a* illustrates a first subset of display pixels 110 comprising the active display pixels a1 to a25 and calculated from a vector data corresponding to a first projection virtual pixel 26*a*. FIG. 5*a* further illustrates a second subset of display pixels 120 comprising the active display pixels b1 to b25 and calculated from a vector data corresponding to a second projection virtual pixel 26*b*. The first and second subset of display pixels 110, 120 can correspond to a different number of active display pixels 10, 12 (a1 to aN and b1 to bN) and/or distribution of the active display pixels 10, 12 on the emissive display 1.

The vector data can be used to calculate two-dimensional coordinates on the emissive display 1 corresponding to the selected subset of display pixels 110, 120. The calculation can be based on trigonometry. The coordinate set of the virtual pixels 26*a* and 26*b* determine the two-dimensional coordinates of each active display pixel 10, 12 in the subset of display pixels 110, 120. Each active display pixels 10, 12 of the subset of display pixels 110, 120 carries partial color information of the virtual pixels 26*a* and 26*b*.

Although the method is illustrated with two subsets of display pixels 110, 120 it applies to more than two subsets of display pixels 110, 120 and a plurality virtual pixels 26*a*, 26*b*.

As illustrated in FIG. 5*b*, the active display pixels 10, 12 in the subset of display pixels 110, 120 are then distributed to an individual physical sub-panel. Here, a sub-panel can correspond to a lens 140 encompassing a subset of the plurality of display pixels 10, 12.

The emissive display 1 can comprise a drive circuit (not shown) configured to control the plurality of display pixels 10, 12 such as to set each display pixel 10, 12 inactive or active. The vector data can then be provided to the drive circuit.

In an embodiment, a computer program comprising instructions which, when executed by a device having processing capability, is adapted to carry out the method disclosed herein.

REFERENCE NUMBERS AND SYMBOLS

1 emissive display
10, 12 display pixel
110 first subset of display pixels
111 light beam
120 second subset of display pixels
14 lens array
16 imaging optical element
18 projection optics, eyepiece
20 eye-box
22 image plane of the emissive display
24 eye-box virtual pixel
26, 26*a*, 26*b* projection virtual pixel
130 pupil plane
140 lens

The invention claimed is:
1. Near-eye light-field display system comprising:
an emissive display comprising a plurality of display pixels, each display pixel having color information and being individually addressable to be set inactive or active such as to generate a light beam towards a pupil plane; and
a lens array positioned between the emissive display and the pupil plane, the lens array comprising an array including a plurality of lenses and being configured to project the light beam generated by the active display pixels to form a projection virtual pixel image;
wherein the color information of the projection pixel image and the position in space of the projection pixel image is determined by the number of the active display pixels and their position on the emissive display; and wherein the color information of the projection pixel image is the sum of the color information of the active display pixels.

2. Near-eye light-field display system according to claim 1, wherein the lens array comprises a matrix array containing between 25 lenses and 64 lenses.

3. Near-eye light-field display system according to claim 2, wherein the lenses has a size between 1 to 5 mm.

4. Near-eye light-field display system according to claim 1, wherein the display pixels have a color depth of 1 bit color or 2 bit color.

5. Near-eye light-field display system according to claim 1, comprising an imaging optical element configured to project the light beams to an image plane.

6. Near-eye light-field display system according to claim 5, further comprising projection optics configured to project the light beams such as to define an eye-box at the pupil plane.

7. Near-eye light-field display system according to claim 1, wherein the emissive display comprises a drive circuit configured to control the plurality of display pixels such as to set each display pixel active or inactive.

8. A wearable device for virtual reality or augmented reality applications, comprising a near-eye light-field display system comprising:
an emissive display comprising a plurality of display pixels, each display pixel having color information and being individually addressable to be set inactive or active such as to generate a light beam towards a pupil plane; and
a lens array positioned between the emissive display and the pupil plane, the lens array comprising an array including a plurality of lenses and being configured to project the light beam generated by the active display pixels to form a projection virtual pixel image;
wherein the color information of the projection pixel image and the position in space of the projection pixel image are determined by the number of the active display pixels and their position on the emissive display; and
wherein the color information of the projection pixel image is the sum of the color information of the active display pixels.

9. The wearable device according to claim 8, comprising virtual reality or augmented reality glasses.

10. Method of projecting a projection virtual pixel using a near-eye light-field display system comprising an emissive display comprising a plurality of display pixels, each display pixel having color information and being individually addressable to be set inactive or active such as to generate a light beam towards a pupil plane; and
a lens array positioned between the emissive display and the pupil plane, the lens array comprising an array including a plurality of lenses and being configured to project the light beam generated by the active display pixels to form a projection virtual pixel image;
wherein the color information of the projection pixel mage and the position in space of the projection pixel image are determined by the number of the active display pixels and their position on the emissive display; and
wherein the color information of the projection pixel image is the sum of the color information of the active display pixels;
the method comprising:
providing a vector data corresponding to the color information of the projection virtual pixel and the position of the projection pixel image relative to the pupil plane;
addressing the emissive display with the vector data, such as to select a subset of display pixels of the emissive display; and
setting active the selected subset of display pixels such that each display pixel in the selected subset of display pixels generates a light beam;
wherein the color information of the projection pixel image is the sum of the color information of the active display pixels of the subset.

11. The method according to claim 10, wherein the vector data comprises a color model and a coordinate set.

12. The method according to claim 11, wherein the color model comprises a three-byte hexadecimal number representing red, green, and blue components of the color.

13. The method according to claim 11, wherein the coordinate set comprises Cartesian x, y, z coordinates.

14. The method according to claim 10, wherein the vector data is used to calculate two-dimensional coordinates on the emissive display corresponding to the selected subset of display pixels.

15. The method according to claim 10, wherein the emissive display comprises a drive circuit configured to control the plurality of display pixels such as to set each display pixel active or inactive; and
wherein the method comprises providing the vector data to the drive circuit.

16. Computer program comprising instructions which, when executed by a device having processing capability, is adapted to carry out the method according to claim 10.

* * * * *